United States Patent
Kieslinger et al.

(10) Patent No.: US 11,254,521 B2
(45) Date of Patent: Feb. 22, 2022

(54) MOVER FOR A TRANSPORT APPARATUS

(71) Applicant: KRONES AG, Neutraubling (DE)

(72) Inventors: Manfred Kieslinger, Stephanskirchen (DE); Stefan Elsperger, Soechtenau (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/973,748

(22) PCT Filed: Mar. 14, 2019

(86) PCT No.: PCT/EP2019/056395
§ 371 (c)(1),
(2) Date: Dec. 9, 2020

(87) PCT Pub. No.: WO2019/238283
PCT Pub. Date: Dec. 19, 2019

(65) Prior Publication Data
US 2021/0253372 A1    Aug. 19, 2021

(30) Foreign Application Priority Data
Jun. 15, 2018   (DE) .................... 10 2018 209 727.5

(51) Int. Cl.
*B65G 54/02*     (2006.01)
*H02K 41/03*     (2006.01)

(52) U.S. Cl.
CPC .......... *B65G 54/02* (2013.01); *H02K 41/03* (2013.01); *B65G 2203/0283* (2013.01); *B65G 2203/042* (2013.01)

(58) Field of Classification Search
CPC .......... B65G 54/02; B65G 2203/042; B65G 2203/0283; F16B 5/0233; H02K 41/031; H02K 41/03; H02K 5/10
(Continued)

(56) References Cited

U.S. PATENT DOCUMENTS 8,922,068 B2    12/2014  Trammell
9,431,886 B2 *   8/2016  Shimura ................. H02K 1/18
(Continued)

FOREIGN PATENT DOCUMENTS

DE              2425027 C2    7/1985
DE        202010002447 U1    7/2010
(Continued)

OTHER PUBLICATIONS

ISA European Patent Office, International Search Report Issued in Application No. PCT/EP2019/056395, dated Jun. 25, 2019, WIPO, 5 pages.

*Primary Examiner* — Gene O Crawford
*Assistant Examiner* — Lester Rushin, III
(74) *Attorney, Agent, or Firm* — McCoy Russell LLP

(57) ABSTRACT

Mover for a transport apparatus in the beverage processing industry, the packaging industry, or the warehouse industry, where the mover can form a linear drive together with a guide rail and a long stator of the transport apparatus, and the mover comprises rolling mechanisms for moving along the guide rail, where the mover comprises a base body and one secondary part or two secondary parts, which, in the case of two secondary parts, are arranged on oppositely disposed sides of the base body and are suitable to interact with an electromagnetic field generated by the transport apparatus to drive the mover along the guide rail characterized in that the mover comprises a device for the continuously variable adjustment of the relative position of a secondary part relative to the base body.

13 Claims, 6 Drawing Sheets

(58) Field of Classification Search
USPC .......................................................... 198/619
See application file for complete search history.

(56) References Cited

U.S. PATENT DOCUMENTS

| | | | |
|---|---|---|---|
| 9,729,039 B2* | 8/2017 | Hon ..................... | H02K 41/033 |
| 2020/0028427 A1* | 1/2020 | Hoeck ................... | B60L 13/06 |
| 2020/0102160 A1* | 4/2020 | Haya .................... | H02K 41/031 |
| 2020/0156875 A1* | 5/2020 | Ragan ................... | B65G 35/06 |
| 2021/0061506 A1* | 3/2021 | Pickett .................. | B65G 54/02 |

FOREIGN PATENT DOCUMENTS

| | | | | |
|---|---|---|---|---|
| JP | S5594176 U | | 6/1980 | |
| JP | 60113651 A | * | 6/1985 | ............ H02K 41/03 |
| JP | S60113651 A | | 6/1985 | |
| JP | S62115780 U | | 7/1987 | |
| JP | 5594176 B2 | * | 9/2014 | |
| WO | 2017108423 A1 | | 6/2017 | |

\* cited by examiner

MOVER FOR A TRANSPORT APPARATUS

CROSS REFERENCE TO RELATED APPLICATIONS

The present application is a U.S. National Phase of International Application No. PCT/EP2019/056395 entitled "MOVER FOR A TRANSPORT APPARATUS," and filed on Mar. 14, 2019. International Application No. PCT/EP2019/056395 claims priority to German Patent Application No. 10 2018 209 727.5 filed on Jun. 15, 2018. The entire contents of each of the above-listed applications are hereby incorporated by reference for all purposes.

TECHNICAL FIELD

The present invention relates to a mover for a transport apparatus in the beverage processing industry, the packaging industry, or the warehousing industry according to the preamble of claim 1 and a method for adjusting the relative position of secondary parts of a mover according to the preamble of claim 10.

BACKGROUND AND SUMMARY

In the beverage processing industry, the packaging industry or the warehousing g industry, movers or also shuttles are already used in transport apparatuses for transporting containers, such as bottles made of plastic material, food such as muesli bars, biscuits or packagings of the same or other packagings, such as cardboard packaging material, but also packages or components that are stored into a (high-bay) warehouse. For this purpose, the movers or shuttles are typically used in combination with a long stator and a guide rail. The guide rail, the long stator, and the mover are configured such that they jointly form a linear drive in the form that the long stator is configured to generate an electromagnetic field that interacts with the mover in such a way that the mover can be moved guided along the guide rail of the transport apparatus.

For this purpose, the mover is known to comprise so-called "secondary parts" on one or both sides which are made of material that can interact with the electromagnetic field. When the mover is arranged on the guide rail, the secondary parts are typically separated from the long stator by an air gap. The size of the air gap can therefore be seen as being a measure of the spacing of the secondary part from the guide rail or the long stator, respectively, and therefore directly determines the forces acting upon the secondary part.

Depending on the application, it can be necessary to adjust the secondary part forces very precisely in order to ensure operability and reproducibility, respectively. This has previously been achieved due to tight tolerances in all relevant production parts of the mover or the transport carriage. A drawback that arises is the high production effort or the production costs, respectively, since the tolerances must be configured to be tight, where the individual tolerances nevertheless add up and large overall tolerances arise which likewise lead to problems.

Another common measure is spacing out the air gap using washers. Although this method is precise, it is relatively labor-intensive because the secondary part must be dismantled for each correction and a spacer must be placed underneath.

OBJECT

Starting out from known prior art, the technical object to be satisfied is therefore to specify a mover and a method for adjusting the relative position of secondary parts of the mover relative to the main body of the mover which enables simplified but at the same time highly precise adjustment of the position of the secondary parts relative to the main body of the mover, preferably in the micrometer range in order to be able to precisely adjust, for example, the size of the air gap and/or the forces acting upon the secondary parts.

SOLUTION

According to the invention, this object is satisfied by the mover for a transport apparatus according to claim 1 and the method for adjusting the relative position of secondary parts of a mover according to claim 10. Advantageous developments of the invention are comprised in the dependent claims.

The mover according to the invention for a transport apparatus in the beverage processing industry, the packaging industry, or the warehousing industry is configured to form a linear drive together with a guide rail and a long stator of the transport apparatus, where the mover comprises rolling mechanisms for moving along the guide rail and where the mover can comprise a base body and one secondary part or two secondary parts which, in the case of the two secondary parts, are arranged on oppositely disposed sides of the base body and are suitable to interact with an electromagnetic field generated by the transport apparatus to drive the mover along the guide rail by way of the long stator and is characterized in that that the mover comprises devices for the continuously variable adjustment of the relative position of a secondary part relative to the base body.

The base body of the mover is to be understood as being a type of carrier structure to which at least the rolling mechanisms and the secondary elements can be attached. The attachment can there be detachable or affixed in the sense that it cannot be terminated without being destroyed.

The long stator can be provided as part of the guide rail but also as a separate component and substantially comprises electric magnets or other components designed to generate an electromagnetic field.

The rolling mechanisms are groups of rollers already known from prior art, where the mover typically comprises several rollers so that it can be held on the guide rail by the rollers without falling off the guide rail under its own weight and possible additional loads, and where the lowest possible friction along the guide rail is possible at the same time. Runners or other sliding devices can also be used there as an alternative to rollers.

The configuration of the secondary parts in such a way that they can interact with an electromagnetic field generated by the transport apparatus to drive the mover along the long stator is to be understood as meaning that the secondary parts consist of electrically conductive material or comprise it and/or are magnetizable such that they experience a force in the electromagnetic field that is generated by the transport apparatus (in particular by the guide rail) which accelerates the mover in the desired direction of motion. For example, iron cores or alloys are conceivable for the secondary parts. However, they can also be permanent magnets that interact with a time-dependent electrical field that has been generated and experience a Lorentz force in the latter.

The continuously variable adjustment of the relative position of at least one secondary part relative to the base body with the aid of the devices for this continuously variable adjustment is to be understood such that in principle any fine adjustment of the position of the secondary part relative to the base body is possible with these devices. This adjustment can be carried out in particular precisely in the sub-millimeter to micrometer range in order to enable the arrangement of the secondary parts in the base body as precisely as possible.

The continuously variable adjustment provides the advantage that it is possible to react very precisely to fluctuations in the electromagnetic field and, in particular, to the location dependency of the electromagnetic field outside the long stator. Once the electromagnetic field has been measured, the position of the secondary part relative to the base body can be set and affixed in such a way that precise desired positioning of the secondary part in the electromagnetic field generated is always ensured and that therefore also the Lorentz force acting upon the secondary part and therefore the mover, which ultimately determines the acceleration of the mover, can be precisely defined. This in turn enables precise control of the motion of the mover. This configuration can be particularly advantageous in the region of track switches where the mover typically changes over from a first long stator with the guide rail optionally to an adjacent, second long stator with the guide rail, since it is precisely in this region that the forces acting upon the mover need to be adjusted precisely to perform the changeover from the first to the second long stator and the respective guide rails.

It is provided in one embodiment that first devices for the adjustment of the relative position of a first secondary part relative to the base body and second devices for the adjustment of the relative position of a second secondary part relative to the base body are provided or a device for the joint adjustment of the relative position of the first and the second secondary part relative to the base body is provided. In the first alternative, it is possible to adjust the position of each secondary part relative to the base body independently of one another. This can be of particular advantage if the mover can also be moved on two oppositely disposed long stators with guide rails. The provision of a common device for the adjustment of the relative position further simplifies positioning the secondary parts.

Furthermore, it can be provided that the devices comprise a spring element which pretensions a secondary part in an initial position and in one direction relative to the base body and the devices further comprise a setscrew in a thread, where the position of the secondary part can be adjusted along the direction by adjusting the setscrew. The setscrew can, but does not necessary need to, be aligned parallel to the pretension force of the spring element. Since the spring element always presses the secondary part against the setscrew, the position of the secondary part can be reliably adjusted by moving the setscrew without there being any free play between the setscrew and the secondary part.

It can be provided alternatively that the devices comprise a first wedge that is immovably connected to the base body and a second wedge that is movable relative to the base body and the first wedge, where an actuator is associated with the second wedge, and the position of the second wedge can be adjusted relative to the first wedge by a motion of the actuator, where the second wedge is arranged between the first wedge and a secondary part such that a motion of the second wedge causes a change in the relative position of the secondary part relative to the base body. The change in the relative position can comprise tilting relative to an axis of the mover or a translatory motion. By using a wedge, in particular with a suitable choice of the angle of attack of the wedge or of the first wedge and the second wedge, respectively, very precise adjustment of the position of the secondary part can be obtained, even if the actuator has a large range of motion of a few millimeters up to one centimeter.

In a further development of this embodiment, a first wedge and a second wedge as well as an actuator are associated with each secondary part, or the mover comprises a first wedge and a second wedge as well as an actuator are associated with each secondary part. The mover can then be configured to be lighter, where the position of the secondary parts can still be adjusted with a high degree of accuracy.

In a further development of the last two embodiments, the actuator comprises a spring element that pretensions the wedge in an initial position and the actuator further comprises a setscrew which is arranged in a thread of the base body such that a motion of the setscrew can cause a motion of the second wedge against the pretension force of the spring element, or the actuator comprises a spring element that pretensions the second wedge in an initial position and the actuator further comprises an setscrew which is arranged in a thread of the second wedge such that a motion of the setscrew can cause a motion of the second wedge against the pretension force of the spring element. Moving the setscrew is then reliably translated into an adjustment of the position of the first or the second secondary part, respectively, without any play remaining between the setscrew and the secondary part, which would result in inaccurate positioning of the secondary part.

Furthermore, it can be provided that the spring element is arranged between the second wedge and the base body and is provided to enclose the setscrew. Precise pretension without moments/forces laterally acting on the setscrew can thus be realized.

It can be provided that the pretension force of the spring elements described is smaller than or at most equal to the static friction force between the setscrew and the thread. The setscrew accidentally unscrewing due to the pretension force of the spring element can then be prevented.

Furthermore, it can be provided that the setscrew described and/or the thread comprise a sealing element. The sealing element can be configured as an O-ring or a ring seal and can be used to keep the interior space of the thread free from unintentional soiling. Protection of the secondary part is also possible in this way, whereby corrosion can be prevented.

It is provided in a further development of this embodiment that the sealing element seals the thread and/or the setscrew against a cover (also referred to as a cover plate). Liquid wetting the mover from the outside can then be effectively prevented from entering.

In one embodiment, the two secondary parts and the devices for the continuously variable adjustment of the relative position of each secondary part are arranged in a housing formed by the base body and a cover plate. In this manner, all elements can be protected from soiling and damage, whereby unintentional adjustment of the position of the secondary parts is prevented at the same time.

The method according to the invention for adjusting the relative position of secondary parts of a mover for a transport apparatus in the beverage processing industry is characterized in that the relative position of a secondary part to the base body is continuously variably adjusted with devices arranged on a mover. The adjustment of the position is then possible with high accuracy without dismantling the secondary parts.

According to the invention, the mover can comprise only one or two secondary parts.

It can be provided that the relative position of a first and/or second secondary part relative to the base body is adjusted independently of one another by first devices associated with the first secondary part and second devices associated with the second secondary part, or the relative position of the first and/or the second secondary part relative to the base body is adjusted by a device for joint adjustment. The first variant allows for a high degree of flexibility with regard to the positioning of the secondary parts, whereas the second variant enables the position of both secondary parts to be adjusted simultaneously in a simplified manner.

It is provided in one embodiment that the devices comprise a setscrew in a thread and a spring element that directly or indirectly pretensions a secondary part in an initial position relative to the base body, and that the setscrew is rotated in the thread for adjusting the relative position such that a motion of the secondary part takes place, where the pretension force of the spring element is less than the static friction force between the thread and the setscrew over an entire adjustment distance of the setscrew. It can then be ensured, firstly, that positioning the secondary part with as little play as possible is achieved, while at the same time loosening the setscrew and thus unintentional, incorrect positioning of the secondary part is prevented.

Furthermore, it can be provided that the adjustment of the relative position of each secondary part is effected in a force measuring device in which an electromagnetic force acting upon each secondary part in the mover is measured. This embodiment provides the advantage that the adjustment of the position of the secondary parts takes place during the force measurement and the results of the force measurement can therefore enter directly into the adjustment of the position.

DETAILED DESCRIPTION

Figure 1:
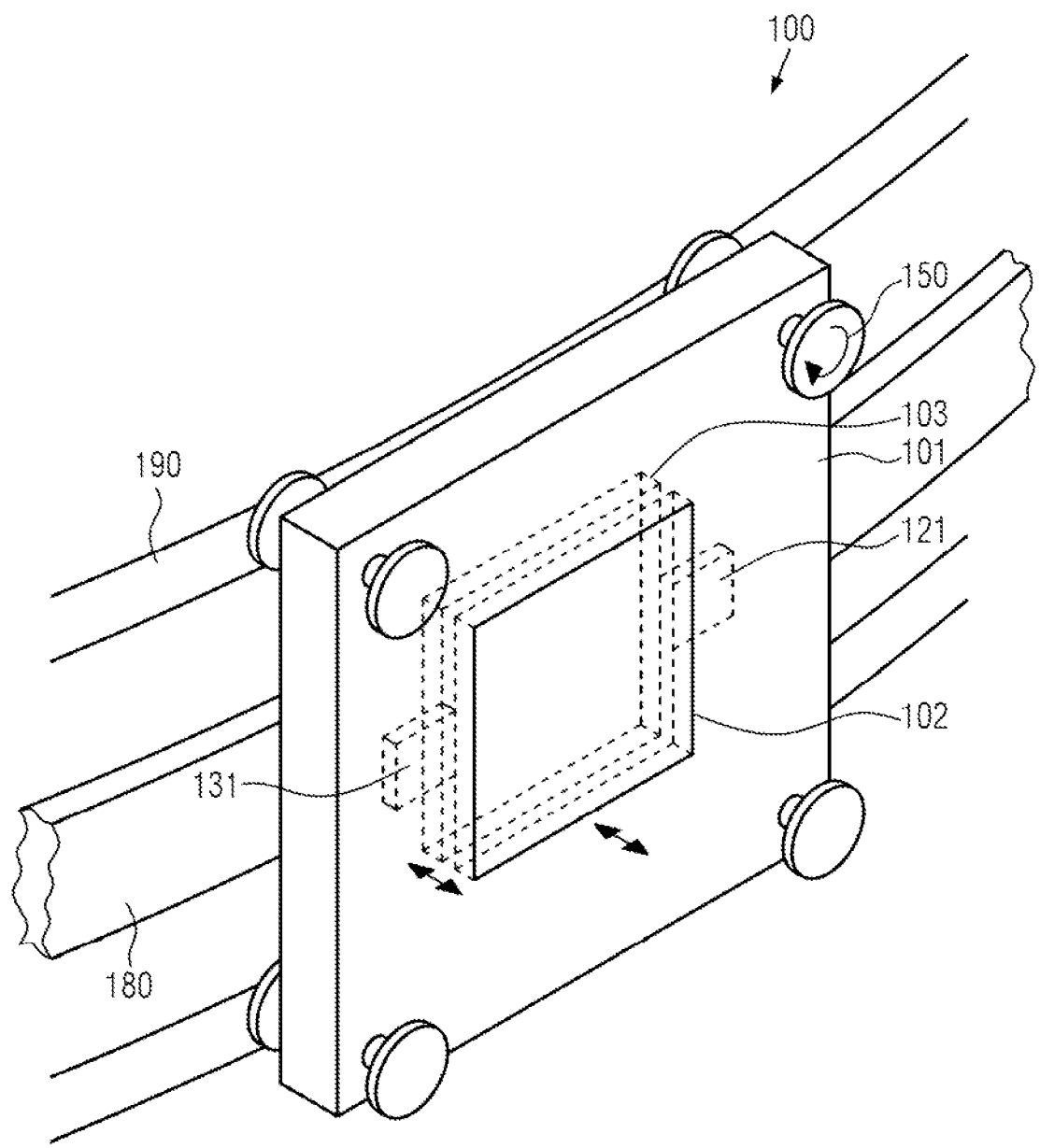
FIG. 1 shows a schematic lateral view of a mover with a first and a second secondary part.

FIG. 1 schematically shows a mover (also referred to as a shuttle or slide) 100 which is configured for a motion along a transport apparatus (presently indicated by a guide rail 190 and a long stator 180 of the transport apparatus). For this purpose, mover 100 typically comprises several rollers 150, where rollers can also be arranged on oppositely disposed sides of the mover, as presently shown. For this purpose, mover 100 comprises a base body 101 which can be made, for example, of plastic material or other material. Rollers 150 are fastened to the base body by way of suitable suspensions and are supported in a rotatable manner so that they can roll along guide rail 190. Instead of rollers 150, other "rolling mechanisms" can also be used, such as runners or other surfaces that enable the mover to slide along guide rail 190.

Even if presently not shown, further rollers can be provided which can also be arranged, for example, with their axis of rotation perpendicular to the rollers presently shown and ensure a certain distance between the mover and guide rail 190. Such configurations are already known from prior art and are not further described below.

According to the invention, the transport apparatus is intended as a transport apparatus which is configured to move mover 100 for transporting packaging material, transporting packagings, or transporting containers in a container treatment system in the beverage processing industry. However, the mover can also be used in the packaging industry, warehousing industry, or in the processing industry as a workpiece carrier or other transporter.

For example, in the case of a container treatment machine, guide rail 190 and long stator 180 can extend through a furnace or other heating device for heating containers or preforms. In this case, movers 100 are configured in such a way that they comprise a container carrier (presently not shown any further) that can receive and affix a container, such as a bottle or a can or a preform, so that the container can be transported with the aid of the mover along guide rail 190 and the long stator through the container treatment machine. In the following, reference shall only be made to the guide rail. It is understood that the long stator is then also always provided for the motion of the mover. If reference is then made to the guide rail, this is also to be understood implicitly as a reference to the long stator. This is especially applicable because the long stator can also be integrated into the guide rail in some embodiments.

The transportation does not necessarily have to take place through a container treatment machine of the container treatment system. It can also be provided that the system composed of the guide rail and the mover enables transportation only between adjacent container handling machines. Container treatment machines are to be understood as meaning heating devices, stretch-blow-molding machines, rinsers, sorting machines, empty bottle inspection machines, full bottle inspection machines, fillers, labelers, closers and packaging machines. In the following, the term is also used synonymously for machines that can also or predominantly be used in the field of warehousing industry and/or packaging industry. All embodiments with regard to the use of the transport apparatus are conceivable there.

As mentioned, guide rail 190 can also be intended as a (long) stator of a linear drive so that mover 100 according to the invention comprises secondary parts 102 and 103, which are arranged on oppositely disposed sides of the mover, so that at least one of secondary parts 102 and 103 faces in the direction guide rail 190 when the mover is arranged on the guide rail. The second secondary part then faces away from guide rail 190 or is arranged on the side of mover 100 pointing away from guide rail 190. This ensures that the mover can also be used on adjacent guide rails that are opposite one another and, for example, can change over from one guide rail to the other guide rail at a track switch.

However, it can also be provided that mover 100 comprises only one secondary part, for example, only secondary part 102 or 103. Instead of one of these secondary parts, a single secondary part can also be provided centrally in the mover. However, this embodiment is not shown in FIG. 1.

Secondary parts 102 and 103 must therefore be configured such that they can interact with the electromagnetic field generated by the guide rail (or the long stator, respectively). Embodiments in which the secondary parts are magnetizable or are at least electrically conductive materials are preferred. For example, the secondary parts can be iron cores, nickel or cobalt cores, or alloys thereof. As an alternative or in addition, the secondary parts can also comprise permanent magnets which react to an inhomogeneous magnetic field or an inhomogeneous electrical field (i.e. in a spatially or temporally variable manner).

The drive is basically determined by the Lorentz force acting upon the secondary part.

Since the Lorentz force acting upon secondary parts 102 and 103 depends significantly on the distance between the secondary parts and the guide rail, because the field strength of the electromagnetic field is location-dependent, it is provided according to the invention that the position of the secondary parts or at least the position of at least one of the secondary parts relative to base body 101 can be continuously variably adjusted by devices 121 and 131 for the adjustment of the relative position of secondary part(s) 102 and 103, respectively. This continuously variable adjustment is particularly advantageous for normal operation of the mover along a guide rail and is even more important in track switch applications (the mover changing over from a first to a second guide rail in the region of a track switch). For track switch applications, the most symmetrical normal force distribution possible upon the mover is a prerequisite for the mover to change over to a second guide rail in a track switch. Normal force is understood to mean the force that is transmitted via the air gap between the secondary part in the mover and the guide rail (or the long stator, respectively). Normal force distribution is understood to mean the normal force upon secondary parts on both sides of the mover is to be equal (i.e. secondary parts 102, 103 or on oppositely disposed sides of only one secondary part, if only one is provided instead of two). Hereinafter, the term "device" or "device for adjusting" shall also be used instead of "device for the adjustment of the relative position".

While the continuously variable adjustment of both secondary parts is basically possible with devices 121 and 131 respectively associated with them, only one device 121 can also be provided for the continuously variable adjustment of the position of one of the secondary parts, whereas the adjustment of the position, for example, with washers in a course manner as compared to the continuously variable adjustment of the position with device 121 is provided for the other secondary part. The washers can have dimensions in the millimeter but also in the sub-millimeter range, for example 0.1 or 0.2 mm, so that, though the position of the secondary part with the washers is coarse, it is still possible in the range of a few millimeters or even in the sub-millimeter range.

The continuously variable adjustment, however, is achieved in that a movable element, which at least partially controls the position of the secondary part or parts, is provided in devices 121 and 131 for adjustment, so that the motion of this movable element causes the position of the secondary parts to be adjusted relative to base body 101. It is provided that this movable element has a maximum amplitude of motion, whereby also the extreme points of the relative position of the secondary parts with respect to base body 101 are defined. A first extreme point characterizes the position of the secondary part at a minimum distance from the main body and the second extreme point the position of the secondary part at a maximum distance from the main body. In between, i.e. between these extreme points, any adjustment of the position of the secondary part or parts relative to base body 101 is possible and therefore the continuously variable adjustment between these extreme points. The motion of the secondary part can preferably take place in a one-dimensional motion from one extreme point to the other extreme point.

Where it is provided in particular that the position or relative position, respectively, of the secondary parts relative to the base body can be adjusted with an accuracy of a few micrometers, in particular an accuracy of at least 10 μm, particularly preferably an accuracy of at least 1 μm.

It is provided in the embodiment of the mover and secondary parts 102 and 103 shown in FIG. 1 that the secondary parts can be moved to and fro in only one direction (double arrows). Depending on the embodiment, however, it is provided that a motion also in several directions in space and also rotational motions are possible such that secondary parts 102 and 103 can be tilted with respect to a selected axis.

FIG. 2 shows a first embodiment of device 121 and 131 for adjustment from FIG. 1.

Figure 2A:
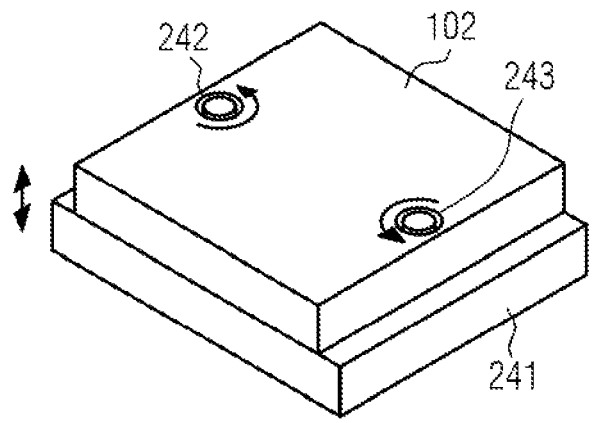
FIGS. 2*a*-*d* show embodiments with a spring element and a setscrew.

For this purpose, FIG. 2a shows the secondary part together with the device for adjustment detached from base body 101. It is understood, however, that FIG. 1 is to be understood as being embedded in the base body.

The device for adjustment according to this embodiment comprises a spring element 241 on which secondary element 102 is positioned. The spring element causes a pretension force which pretensions secondary element 102 to an initial position. A precise specification of the position of the secondary part in this initial position is not necessary, but it preferably corresponds to one of the previously mentioned extreme values for the change in position of the secondary parts, namely where the spacing of the secondary part from (the center of) base body 101 is at a maximum.

In order to now change the relative position of secondary part 102 relative to the base body, it is provided in this embodiment that the secondary part comprises openings through which setscrews 242 and possibly 243 with a thread are passed. These openings in secondary part 102 can extend on oppositely disposed edges of secondary part 102. Only one opening for a screw or several openings for more than two screws can also be provided. It can be provided in particular that each corner of secondary part 102 is associated with an opening for a corresponding setscrew.

In a modified application, threaded holes are provided in the secondary parts. In this case, the screws are adjusted from the opposite side of the mover. In order to be able to adjust the setscrews from the opposite side, the threaded holes in the secondary parts must be arranged offset. This modified application is presently not shown.

Figure 2B:
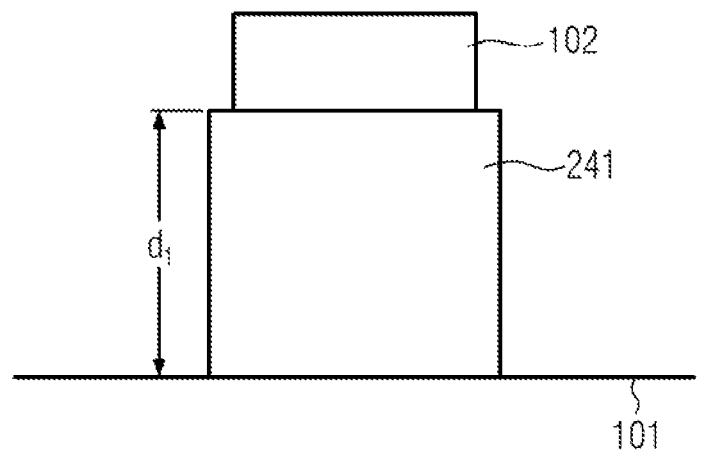
Figure 2B:
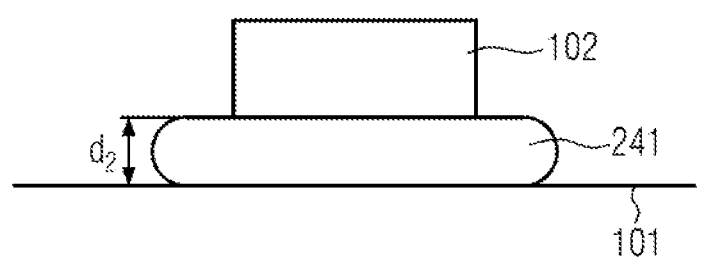

As already explained with reference to FIG. 2a, FIG. 2b shows the motion of the secondary element relative to the "base area" of base body 101. The "base area" is the area into which the threads for screwing in screws 242 and 243 (i.e. threads 261 and 262 of FIGS. 2c and 2d) are introduced. In the extreme situation shown above in FIG. 2b, the screws are not inserted or only inserted minimally and secondary part 102 is pretensioned to the initial position at a distance $d_1$ from base body 101 solely by the pretension force of spring element 241. If screws 242 and 243 are screwed into threads 261 and 262 to a maximum, the situation below in FIG. 2b is reached which represents the minimum distance $d_2$ between secondary part 102 and base body 101. Both positions are of course only shown schematically and do not represent real size relationships. It can be provided according to the invention that the maximum amplitude of motion of the secondary part is 0.1 mm to 1 mm, or up to 3 mm, where the thread and the setscrews are preferably manufactured with such precision that a change in the relative position of the secondary part relative to the base body can be adjusted precisely in the submillimeter range, particularly preferably in the micrometer range up to 1 μm.

Figure 2C:
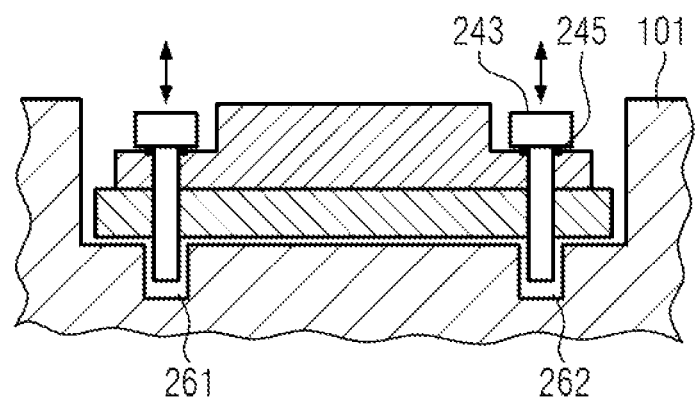
Figure 2D:
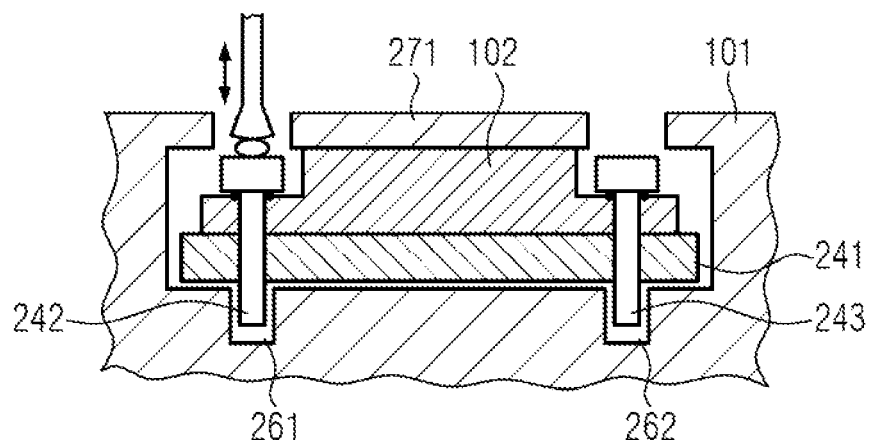

As can be seen in FIGS. 2c and 2d, the screws extend through spring element 241 into base body 101. By screwing setscrews 242 and 243 into the base body, secondary part 102 is moved in the direction of the base body, causing spring element 241 to be compressed from its initial position (see also the schematic representation in FIG. 2b).

The total amplitude of motion of secondary part 102 is preferably selected such that spring element 241 is not destroyed or damaged when screws 242 and 243 are screwed in to a maximum and therefore at a minimum distance of secondary part 102 from base body 101. Particularly preferably, the amplitude motion is chosen such that the spring element is within the validity range of Hook's law over the entire amplitude of motion, i.e. the force caused by the spring element is proportional to the compression of the spring.

For a possible loosening behavior of the setscrews, however, a characteristic curve that is as flat as possible (e.g. degressive) is advantageous as an alternative. This includes all degressive spring characteristics curves whose inclination is flatter than that of a spring that follows Hook's law, at least in a partial region of the characteristic curve. This has the advantage that the setscrew does not suffer any significant loss of pretension force over the entire adjustment range, and it is therefore unlikely that it will come loose by itself.

If the minimum required pretension force cannot be maintained, safety measures such as screw adhesive etc. are conceivable. However, preference is given to securing elements that provide adequate securing even after repeated adjustments (e.g. self-locking HeliCoil inserts).

The spring element can be configured as a planar body, as presently shown, but can also be provided as an individual spring. In particular, elements such as wave springs, conventional compression springs, or disk springs and also a steel strip can be considered. Variants made of elastic and planar materials, such as foam, rigid foam, or rubber, are particularly preferred since distribution of the pressing force which is transmitted via the screws to secondary part 102 and therefore to spring element 241 is obtained. If mechanical springs such as compression springs are used, they can be arranged concentrically to the setscrews so that the setscrews extend through the spring elements.

FIG. 2c shows an embodiment in which the setscrews or the thread extending through the secondary part on the surface facing away from the base body comprise a sealing element 245 which ensures that the interior space of the thread is sealed against the external environment. Since the mover can typically also be used in the context of filled containers or at least in the presence of liquids, corrosion of the thread and therefore possible difficulties in screwing screws 242 and 243 in and out can be prevented.

In order to prevent undesired soiling even better, it can also be provided that secondary part 102 and spring element 241 are arranged between a part of the base body 101 (for example in the bulge or depression shown) and a cover (also referred to as a cover plate) 271, where the cover in FIG. 2d is shown only in cross section. The cover preferably extends at least over the entire area occupied by the secondary part and comprises the openings illustrated through which screws 242 and 243 can be inserted for changing the relative position of secondary part 102 relative to base body 101. In this way, cover 271 also limits the amplitude of motion of secondary part 102 since it cannot move further than to cover 271. It can thus also be ensured that the pretension force of spring element 241 is still sufficient to cause the secondary part to be pretensioned in a defined position, namely in abutment against cover 271, when the screws are not inserted. Since, according to the invention, very thin covers with a thickness of less than 1 mm, preferably 0.5 mm or less, are employed, the forces that can be absorbed by the cover 271, however, are limited.

Like in FIG. 2c, sealing elements can also be provided in FIG. 2d. The same sealing elements of FIG. 2c can then also be employed in FIG. 2d. As an alternative or in addition, sealing elements which enable a seal between the setscrews (in particular the screw heads) and cover (also cover plate) 271 can be provided.

Cover 271 can also be provided in such a way that it is only applied after the adjustment of the secondary part or parts and completely encloses the secondary part as well as the setscrews, i.e. does not have the openings through which setscrews 242, 243 are passed.

As an alternative or in addition, one or more openings can also be provided in a cover plate according to each of the embodiments described through which screws or other connecting elements can be passed that allow for the cover plate to be connected to the main body of the mover. For example, click connections can also be employed instead of screws. Furthermore, it can be provided that the cover plate comprises a sealing element extending substantially around the former's entire circumference (or at least around a region of the cover plate which encloses the region in which the secondary part is embedded in the base body) which enables sealing the secondary element arranged under the cover plate and therefore also the cavity in the base body against the environment.

As can be seen from FIG. 2a, the use of several screws 242 and 243 can ensure that secondary part 102 can be aligned not only with respect to the double-arrow direction shown in FIG. 2a, but also the relative position relative to base body 101 in several spatial directions. By screwing in screw 242 by a first distance and screwing in screw 243 by a second distance differing from the first distance, an inclined position of the secondary part can then be obtained. This can compensate, for example, for misalignments of the rolling mechanism such that the surface of the secondary part ultimately extends parallel to the surface of the guide rail or to an imaginary surface of the mover or to any other surface despite the "position inclined" relative to the base body.

With the employment of further screws, in particular four screws, each of which can be arranged in the corners of the secondary part shown in FIG. 2a, this possibility of adjusting the relative position of secondary part 102 relative to the base body can be further improved.

It goes without saying that the embodiments shown in FIG. 2 only with reference to secondary part 102 can also be provided for second secondary part 103 (see FIG. 1). A completely separate configuration of the device for the adjustment of the second secondary part with a spring element and associated setscrews and threads in the base body can be provided there, as described in FIGS. 2a to 2d. It can also alternatively be provided that secondary parts 102 and 103 comprise spring elements associated with them, but only one setscrew or a group of setscrews are provided for joint adjustment of the position of secondary parts 102 and 103 relative to the spring elements or the base body, respectively, where these setscrews can then extend through both secondary parts and can cause the joint adjustment of the relative position of secondary parts 102 and 103 by way of suitable threads and counter supports.

It can also alternatively be provided that the setscrews do not run through the secondary parts as shown, but rather allow for a motion of cover plate or cover 271 towards or away from spring element 241, so that the relative position of the secondary parts relative to the base body is changed by adjusting the position of the cover plate and the pretension force of spring element 241 (analogously then also for further secondary part 103 from FIG. 1).

Figure 3A:
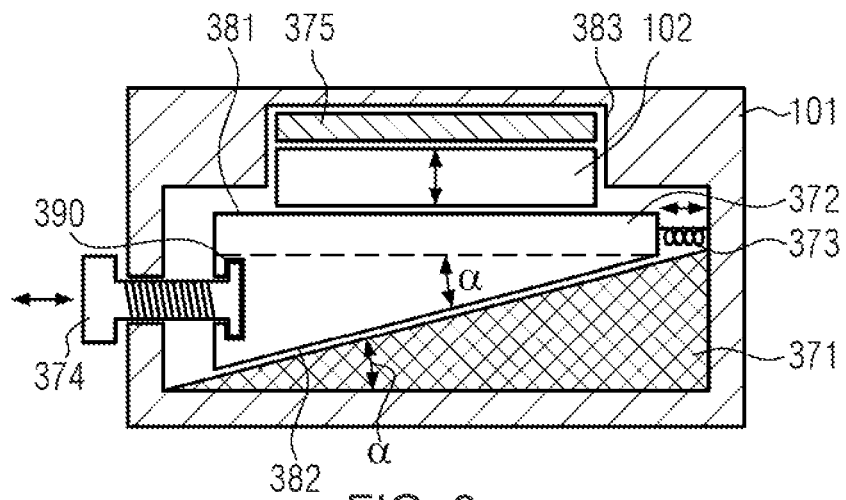
FIGS. 3*a*-*c* show embodiments with wedges movable against one another.
Figure 3B:
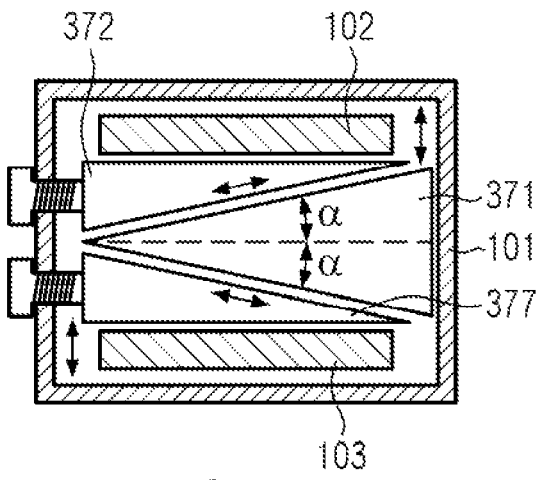
Figure 3C:
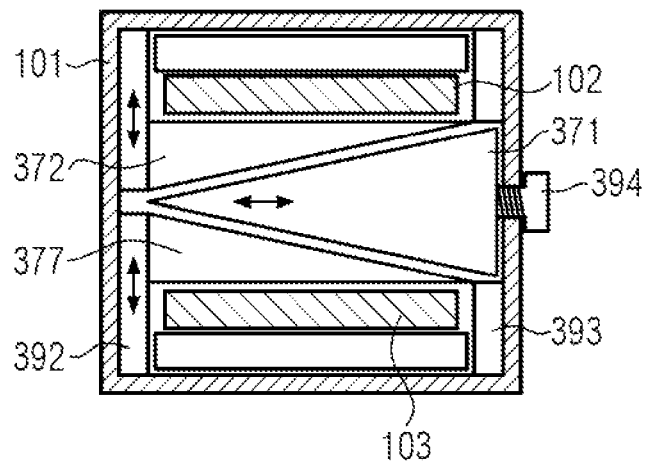

FIGS. 3a to 3c show further embodiments in which secondary part 102 is mounted on a wedge 372, the motion of which ultimately enables a change of the relative position of the secondary part. In FIGS. 3a to 3c, the base body is shown similarly to FIGS. 2a to 2d in a cross section which extends perpendicular through the surface of the secondary part from FIG. 1.

For this purpose, wedge 372 comprises a substantially planar side 381 and a side 382 which is beveled at an angle α with respect to the former side. While the wedge is only shown there in a lateral view, it is provided that it extends out of the plane of the drawing with the same dimensions so that it has the shape of a polyhedron with a trapezoidal base area and rectangular side surfaces perpendicular to the base area, where the trapezoidal base area corresponds to the area of wedge 372 shown there. It is understood that this embodiment is only by way of example and any other external shape of the wedge, in particular also irregular external shapes, is conceivable.

Provided in base body 101 is a further wedge 371, which likewise has a surface beveled having an angle α, and on which second wedge 372 is mounted slideable along the double arrow shown. Wedge 371 (also "first wedge") is arranged immovable in the base body according to the embodiment shown in FIG. 3a. It can be connected to the base body in a suitable manner (for example screws or plug connections) or form a part of the base body so that the base body is already formed with wedge 371 when manufactured.

Furthermore, it can be provided that a spring element 375 is arranged on the side of secondary part 102 opposite second wedge 372 and restricts the motion of secondary part 102 in this direction. Alternatively, it can also be provided that secondary part 102 is arranged on wedge 372 in a guide that only allows the secondary part to move in a plane that extends perpendicular out of the illustrated image plane and is parallel to surface 381 of the second wedge. This ensures that the motion of the secondary part does not separate from the motion of wedge 372 when wedge 372 moves relative to wedge 371. By providing an indentation 383 in base body 101 and an arrangement of secondary part 102 in this region, it can at the same time be achieved that a resulting change in position of secondary part 102 relative to base body 101 is possible only in the direction toward wedge 371 or away from it, like it is indicated by the double arrow shown.

In order to now enable the secondary part to move in the direction of the double arrow shown, wedge 372 is moved relative to wedge 371. For this purpose, an adjusting element, in particular a setscrew 374, can be provided which can be screwed into base body 101 and touches wedge 372 so that setscrew 374 being screwed in leads to wedge 372 moving along the inclined surface of wedge 371.

In order to avoid an unintentional motion of wedge 372, the latter can be pretensioned against screw 374 by a spring element 373 on the side opposite screw 374. Alternatively, it can also be provided that two setscrews are provided, where the first setscrew is arranged at the position of setscrew 374 and the further setscrew replaces spring element 373. Alternatively, it can also be provided that no spring element 373 is provided, but instead the screw is affixed in a holder 390 in wedge 372 in such a way that it can indeed be rotated in this holder, but a translatory motion of setscrew 374 relative to second wedge 372 is not possible.

Alternatively, the thread can also be disposed in wedge 372. The holder is then arranged in housing 101 which allows for a rotational motion but prevents a translatory motion between the housing and the screw.

In a further alternative, the thread is likewise disposed in wedge 372. When using a spring element 373, the spring element can then be positioned around screw 374 between wedge 372 and base body 101. This is not shown in the drawing.

The contacting surfaces of wedges 371 and 372 preferably extend over a distance which is longer than the extension of secondary part 102 in this direction. In particular, the length $l_{381}$ of distance 381 or the width of the corresponding area, which is given by $\cos \alpha * l_{382} = l_{381}$, should be 20% greater than the width of the area of secondary part 102 bearing thereagainst in this direction. It can then be ensured that even with a motion of wedge 372 having a large amplitude, secondary part 102 does not slip past wedge 372 or an inclined position of secondary part 102 arises. Since the maximum amplitude of motion of the secondary part is again in the millimeter or in the sub-millimeter range, the setting angles of the surfaces are preferably in the range of one degree, particularly preferably below 0.5 degrees. At a setting angle α=0.5 degrees, a motion of second wedge 372 along surface 382 by one centimeter causes a change in height of secondary part 102 by 0.0087 centimeters which is already in the range of a few micrometers so that the desired accuracy can be obtained with this amplitude of motion.

However, it is also conceivable that the wedges are shorter than the secondary parts.

It is understood that a similar device can be provided for second secondary part 103 from FIG. 1 and can be completely separated from the device described for secondary part 102 in FIG. 2a so that both secondary parts 102 and 103 can be adjusted independently of one another.

However, as described in FIG. 3b, it can also be provided that, although separate wedges 372 and 377 with associated setscrews are provided for first secondary part 102 and second secondary part 103, only one common first wedge 371 is fixedly arranged in base body 101. In this case, wedge 371 on both sides, which each touch one of wedges 372 and 377, is provided with a beveled surface which encloses an angle α with respect to the dashed horizontal line shown. In this way, no two "first wedges" separated from one another need to be provided similarly to wedge 371, and space can be saved in the base body. Nothing changes in this embodiment with regard to the setting angles available.

FIG. 3c shows an alternative embodiment in which common wedge 371 is mounted movable with respect to base body 101 by way of a setscrew 394. If wedge 371 is driven in the direction of the tip of wedge 371 shown there (by rotating the setscrew accordingly), then wedges 372 and 377 are moved up or down, respectively, in guides 392 and 393 provided, so that secondary parts 102 and 103 are moved outwardly (in FIG. 3c upwardly or downwardly, respectively). The positions of secondary parts 102 and 103 can then be adjusted synchronously with one another which at the same time can take place with high accuracy.

While FIGS. 3a to 3c only provide a second wedge 372 or 373, respectively, for each secondary part 102 and 103, it can also be provided that several wedges are intended for each of the secondary parts and are arranged in a direction perpendicular to the image plane. They can preferably be moved independently of one another, so that an inclined position of the respective secondary part is also possible with this embodiment similarly to the description of the embodiments in FIGS. 2a to 2d.

Although not described in detail, it can also be provided in the embodiments shown in FIGS. 3a to 3c that a cover for the secondary part is provided similarly to the cover or cover plate 271 according to FIG. 2d. If sealing rings and corresponding sealing surfaces are furthermore provided in the region of the setscrews, then this is a system in which secondary part 102 is completely encapsulated, but corrections can later nevertheless be made with the setscrews.

Figure 4A:
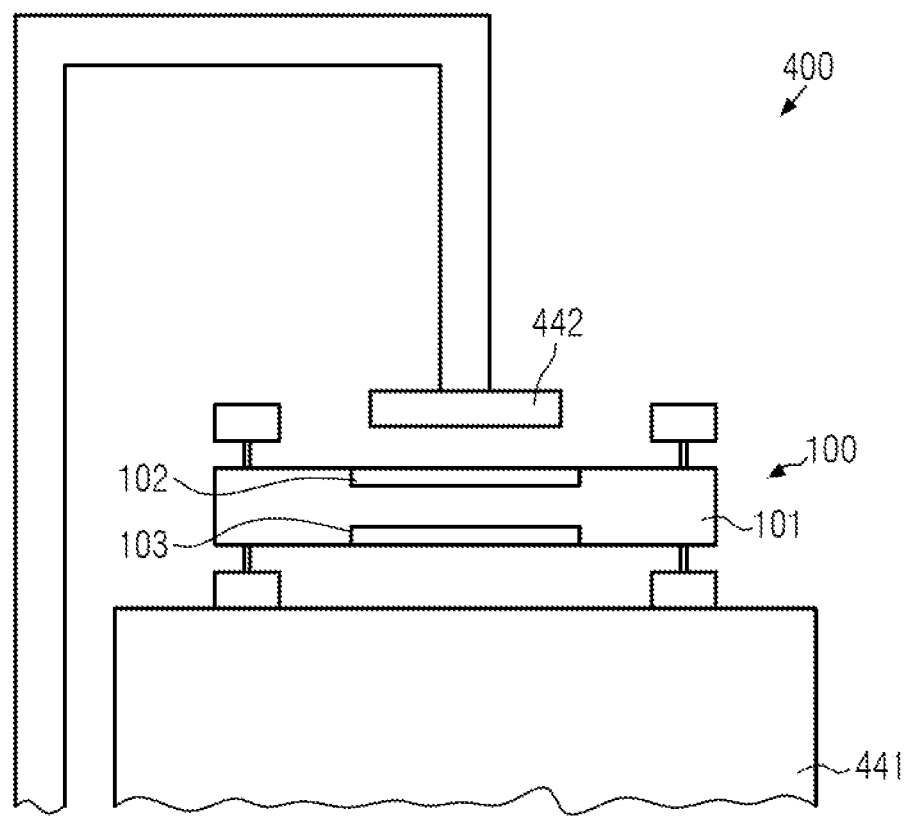
FIGS. 4*a* and *b* show a mover in a force measuring device according to various embodiments.

FIGS. 4a and b show embodiments in which the adjustment of the relative position of secondary parts 102 and 103 relative to base body 101 takes place in a force measuring device 400. In both cases, the force measuring device is substantially formed by a support table 441 and a (movable) force gauge 442, at the one end of which, that points in the direction of support table 471, a magnet or electric magnet can be arranged. In the embodiment shown in FIG. 4a, mover 100 is positioned on support table 441 such that one of secondary parts 102 faces away from the surface of support table 441, whereas other secondary part 103 points towards the surface of the support table. The situation shown relates to the adjustment of the position of secondary part 102, for which reason only this secondary part shall be mentioned below. It is understood that an analogous method can also be carried out when mover 100 is turned around in such a way that secondary parts 102 and 103 swap positions. If only one secondary part is provided, then the mover does not need to be turned around. However, even if only a single secondary part is provided, for example, secondary part 102, it can be advantageous to turn the mover and to measure the forces acting upon oppositely disposed surfaces of the secondary part. In this way, sources of error that are dependent on the support side of the mover on support table 471 can thus be identified and compensated for.

Figure 4B:
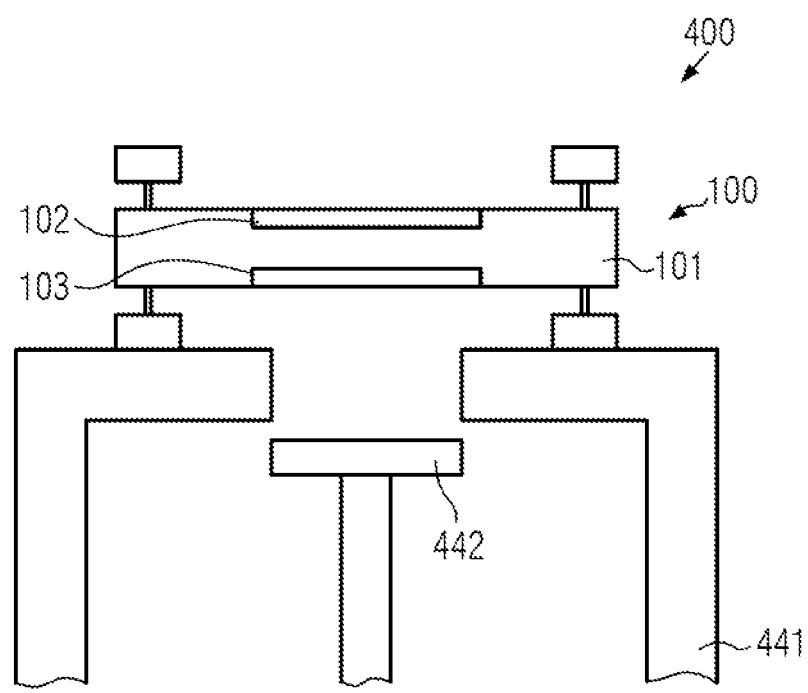

In an alternative but preferred variant, force gauge 442 which is firmly connected to ferromagnetic material is placed below mover 100 so that the mover rollers are drawn against the support table 441 by the magnetic force. Additional measures for preventing the mover from rising from the support table are therefore unnecessary. Furthermore, this arrangement eliminates the need for a reciprocating motion of force gauge 442. This embodiment is illustrated in FIG. 4b.

In the initial situation of the force measurement method, secondary part 102 is in an "initial position" which can be viewed as substantially any position in the base body and which may require adjustment such that a distance between the secondary part and base body 101 and therefore also the spacing of secondary part 102 from a guide rail 190 is to be adjusted, as has been described in FIG. 1.

In order to determine whether such adjustment is necessary, force gauge 442 is moved towards the mover, i.e. in the direction of the support table. Secondary element 102 and an (electric) magnet installed in force gauge 442 (magnetizable and/or ferromagnetic material, in particular a piece of iron, can also be used instead of the electric magnet) interact with one another so that the force acting upon the electric magnet can be measured by a suitable force gauge in the device. At the same time, the position of the electric magnet relative to the support table can be determined and adjusted with high accuracy (preferably in the micrometer range). For this purpose, the force between secondary part 102 and the (electric) magnet or magnetizable and/or ferromagnetic material disposed on the force gauge is measured and set to a default value.

If the force measured is too low, then the force on secondary part 102 measured is also lower than the desired value and secondary part 102 is too far away from the electric magnet so that with the devices described with reference to FIGS. 1 to 3 for the adjustment of the relative position of secondary part 102, the relative position of secondary part 102 relative to the base body can be changed and this secondary part can be moved further away from the base body so that it is directed closer to the electric magnet.

In the other case, in which the force acting upon the electric magnet is greater than a desired value, secondary part 102 is moved further into base body 101 so that the spacing from the electric magnet increases and the force acting reduces until the desired value has been reached.

This can then also be carried out with secondary part 103 or, if the motion of the secondary parts is coupled relative to the base body, the secondary part can already be adjusted. The secondary parts are then positioned in the base body in such a way that the spacing or the forces, respectively, of the secondary parts from guide rail 190 in FIG. 1, if the mover is arranged on the guide rail, has exactly the desired value and the functionality, such as reproducible track switch triggering, is therefore ensured.

In addition to this force-based variant, there is also a geometry-based variant in which the position of the secondary part is measured relative to a reference plane, which preferably extends to the roller contact points with support surface 441, in order to set a default for the gap.

The invention claimed is:

1. Mover for a transport apparatus in a beverage processing industry, a packaging industry, or a warehousing industry, where said mover can form a linear drive together with a guide rail and a long stator of said transport apparatus, and said mover comprises rolling mechanisms for moving along said guide rail, where said mover comprises a base body and two secondary parts which are arranged on oppositely disposed sides of said base body and are suitable to interact with an electromagnetic field generated by said transport apparatus to drive said mover along said guide rail, where said mover comprises devices for a continuously variable adjustment of a relative position of a secondary part relative to said base body, and where first devices for said adjustment of the relative position of a first secondary part relative to said base body and second devices for said adjustment of the relative position of a second secondary part relative to said base body are provided, or a device for a joint adjustment of the relative position of said first secondary part and said second secondary part relative to said base body is provided.

2. The mover according to claim 1, where said devices comprise a spring element which pre-tensions said secondary part in an initial position and in a direction relative to said base body and said devices further comprise a setscrew in a thread, where the position of said secondary part can be adjusted along the direction by adjusting said setscrew.

3. The mover according to claim 1, where said devices comprise a first wedge that is immovably connected to said base body and a second wedge that is movable relative to said base body and said first wedge, where an actuator is associated with said second wedge and the position of said second wedge can be adjusted relative to said first wedge by a motion of said actuator, where said second wedge is arranged between said first wedge and said secondary part such that said motion of said second wedge causes a change in the relative position of said secondary part relative to said base body.

4. The mover according to claim 3, where each secondary part is associated with said first wedge and said second wedge as well as said actuator or where said mover comprises said first wedge and each secondary part is associated with said second wedge and said actuator.

5. The mover according to claim 3, where said actuator comprises a spring element which pre-tensions said second wedge in an initial position and said actuator further comprises a setscrew which is arranged in a thread of said base body such that moving said setscrew can cause a motion of said second wedge against a pre-tension force of said spring element; or
    where said actuator comprises a spring element which pre-tensions said second wedge in an initial position and said actuator further comprises a setscrew which is arranged in a thread of said second wedge such that moving said setscrew can cause a motion of said second wedge against the pre-tension force of said spring element.

6. The mover according to claim 5, where said spring element is arranged between said second wedge and said base body and is provided to enclose said setscrew.

7. The mover according to claim 6, where the pre-tension force of said spring elements is smaller than or at most equal to a static friction force between said setscrew and said thread.

8. The mover according to claim 2, where said setscrew and/or said thread comprises a sealing element.

9. The mover according to claim 8, where said sealing element seals said thread and/or said setscrew against a cover.

10. The mover according to claim 1, where said secondary part or said two secondary parts and said devices for the continuously variable adjustment of the relative position of each secondary part are arranged in a housing formed by said base body and a cover.

11. A method for adjusting a relative position of secondary parts of a mover for a transport apparatus in the beverage processing industry, the packaging industry, or the warehousing industry, where said mover can form a linear drive together with a guide rail and a long stator of said transport apparatus, and said mover comprises rolling mechanisms for moving along said guide rail, where, in the case of two secondary parts in said mover, said secondary parts are arranged on oppositely disposed sides of a base body of said mover and are suitable to interact with an electromagnetic field generated by said transport apparatus to drive said mover along said guide rail, said method comprising continuously adjusting the relative position of a secondary part relative to said base body variably with devices arranged on said mover, where the relative position of a first and/or second secondary part relative to said base body is adjusted independently of one another by first devices associated with said first secondary part and second devices associated with said second secondary part, or the relative position of said first and/or said second secondary part relative to said base body is adjusted by a device for the joint adjustment.

12. The method according to claim 11, where said devices comprise a setscrew in a thread and a spring element that directly or indirectly pre-tensions a secondary part of said secondary parts in an initial position relative to said base body, and that said setscrew is rotated in said thread for adjusting the relative position such that a motion of said secondary part takes place, where the pre-tension force of said spring element is lower than a static friction force between said thread and said setscrew over an entire adjustment distance of said setscrew.

13. The method according to claim 11, where the adjustment of the relative position of each secondary part is effected in a force measuring device in which an electromagnetic force acting upon each secondary part in said mover is measured.

\* \* \* \* \*